United States Patent
Kleinloh et al.

(10) Patent No.: US 7,924,438 B2
(45) Date of Patent: Apr. 12, 2011

(54) METHOD FOR MEASURING WEAR IN THE REFRACTORY LINING OF A METALLURGICAL MELTING VESSEL

(75) Inventors: Juergen Kleinloh, Duisberg (DE); Dieter Blissenbach, Moers (DE); Stefan Kirchhoff, Dortmund (DE); Christoph Carlhoff, Willich (DE)

(73) Assignee: Specialty Minterals (Michigan) Inc., Bingham Farms, MI (US)

( * ) Notice: Subject to any disclaimer, the term of this patent is extended or adjusted under 35 U.S.C. 154(b) by 227 days.

(21) Appl. No.: 12/085,851

(22) PCT Filed: Dec. 1, 2006

(86) PCT No.: PCT/US2006/046077
§ 371 (c)(1),
(2), (4) Date: Apr. 28, 2009

(87) PCT Pub. No.: WO2007/064928
PCT Pub. Date: Jun. 7, 2007

(65) Prior Publication Data
US 2009/0303494 A1 Dec. 10, 2009

(30) Foreign Application Priority Data
Dec. 2, 2005 (DE) .......................... 10 2005 057 733

(51) Int. Cl.
*G01B 11/24* (2006.01)
(52) U.S. Cl. ..................................................... 356/601
(58) Field of Classification Search .................. 356/601, 356/614, 627, 602
See application file for complete search history.

(56) References Cited

U.S. PATENT DOCUMENTS

| 4,708,482 | A | * | 11/1987 | Neiheisel ........................ 356/602 |
| 4,893,933 | A | | 1/1990 | Neiheisel et al. |
| 5,125,745 | A | | 6/1992 | Neiheisel et al. |
| 5,127,736 | A | * | 7/1992 | Neiheisel ........................ 356/602 |
| 5,212,738 | A | | 5/1993 | Chande et al. |
| 6,922,251 | B1 | | 7/2005 | Kirchhoff et al. |
| 6,922,252 | B2 | | 7/2005 | Harvill et al. |
| 2009/0237678 | A1 | * | 9/2009 | Brzoska et al. ................ 356/608 |

FOREIGN PATENT DOCUMENTS

DE    102 57 422 A1   12/2002

OTHER PUBLICATIONS

International Search Report dated Mar. 11, 2008 of International Patent Application PCT/US06/46077 which is a patent family member of the present application.
Written Opinion dated Mar. 20, 2008 issued in counterpart International Patent Application PCT/US06/46077, forwarded in a communication dated Jun. 12, 2008.

* cited by examiner

*Primary Examiner* — Tarifur R. Chowdhury
*Assistant Examiner* — Isiaka O Akanbi
(74) *Attorney, Agent, or Firm* — Derek S. Jessen; Leon Nigohosian, Jr.

(57) ABSTRACT

A method of a method for measuring wear in the lining of a metallurgical melting vessel such as a steel converter (1), by a laser scanner (2) A laser having a contouring system on a cart can be moved between measurements The laser contouring system references three permanent marks behind the cart (PM1, PM2, PM3) and two temporary marks positioned near the vessel (TM1, TM2) The distances from the movable cart to each of the five marks is determined during an initial measurement by the contouring system Every time the cart is moved and a new measurement is taken, the contouring system scans the vessel and the two temporary marks but not the permanent marks.

15 Claims, 1 Drawing Sheet

Fig. 1
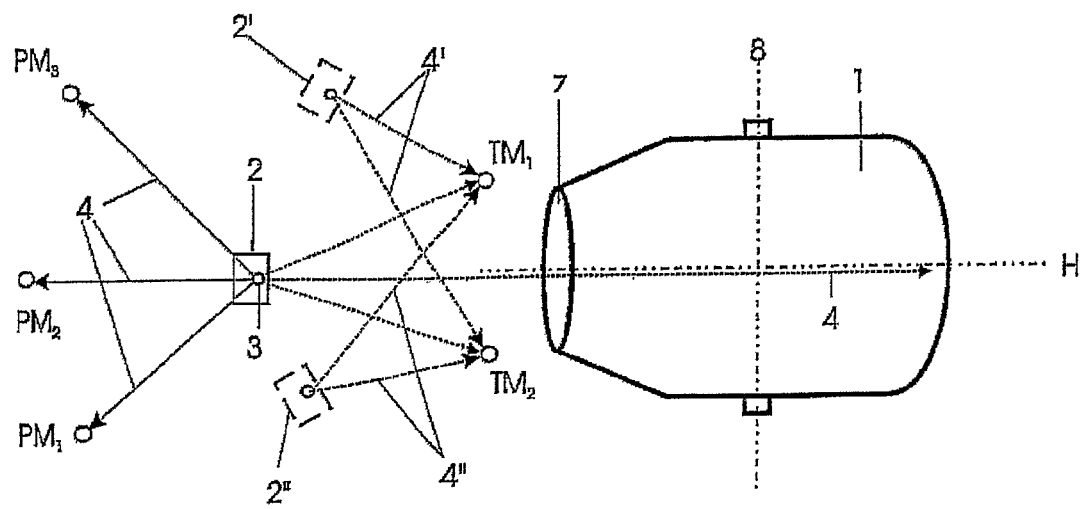
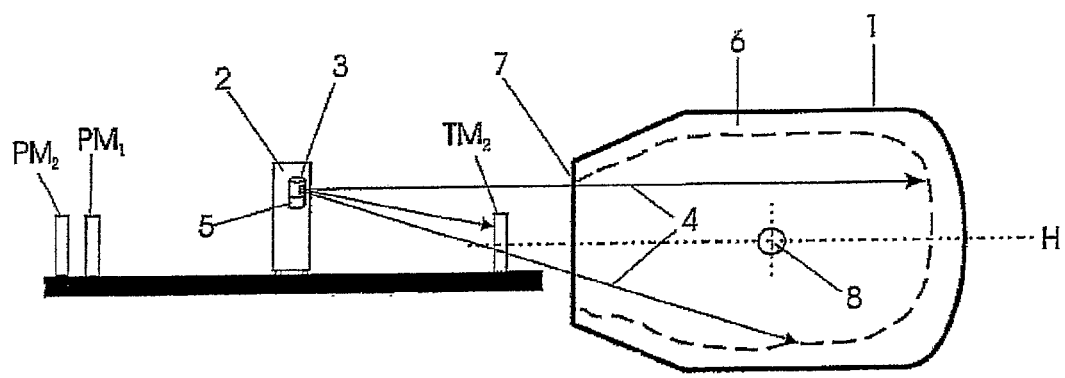
Fig. 2

METHOD FOR MEASURING WEAR IN THE REFRACTORY LINING OF A METALLURGICAL MELTING VESSEL

The invention relates to a method for measuring wear in the lining of a metallurgical melting vessel, e.g. a steel converter, by means of a laser scanner.

It is extremely important to measure wear in the lining of converters or ladles which are used for example in the steel making process. This renders it possible to optimize the service life of the container and to prevent excessive wear in the lining from causing risks pertaining to production or industrial safety. Wear linings of converters must be renewed relatively often, as their life time varies from one or two weeks normally up to a few months, depending on what is melted in the converter, on the material of which the lining is made, and naturally on the number of melts for which the converter is used. Generally speaking, a converter can last for about 100 to 5000 melts.

The wear in a lining is measured by a method based on measuring the time of flight or the phase shift of a laser beam. The laser beam is directed to the lining on the inner surface of the converter, from which it is reflected back to the measuring device. In the method based on measuring the time of flight, the distance between the measuring device and each measured point on the lining to be measured in the coordinate system of the measuring device can be calculated on the basis of the time difference between the emitting time and the return time of the laser beam. The measured points define the wear profile of the lining, which may be output for instance to a display terminal, by which the wear profile measured from a converter in process can be compared graphically and numerically with the profile that was measured on the safety lining of the container or the working lining before the container was actually brought into use, i.e. before the first melt.

To measure wear in the lining of three-dimensional objects, such industry, by non-contacting methods, such as laser measurement, requires that the measuring device and the object to be measured are represented in the same coordinate system. Combining the coordinate systems of the measuring device and the object to be measured is called fixing. In other words, the measuring device is positioned or fixed in relation to the object. For fixing it is necessary to use at least three permanent marks, with the laser beam of the measuring device being directed sequentially towards each permanent mark, and the coordinates of each permanent mark are measured in the coordinate system of the measuring device. Even if the measuring device has a fixed position in the vicinity of the container through permanent marks, it is advisable to perform fixing for each lining measurement again, which ensures a change in the ambient conditions and other factors not to cause any errors.

In the so-called direct method normally used for positioning or fixing, stationary fixing points, also called permanent marks, are mounted to the object to be measured such as a container, e.g. in the vicinity of the container opening. By means of the permanent marks the coordinate systems of the object and the measuring device can be mathematically combined. In the direct method, the object to be measured and the measuring device can be included into the same coordinate system by measuring at the same time both the permanent marks and the points to be actually measured.

In a special case where the object to be measured is supported by a tilt axis, indirect angle measurement fixing can be applied, with the permanent marks being located on the bottom of container or outside of it. An angle measuring device can be mounted, for example, to the tilt axis of the container or can be mounted elsewhere to the container. An example for such measuring device is a so-called inclinometer. At present, fixing by means of angle measurement is an indirect method which is used when it is difficult to provide the object to be measured with necessary fixing points which are clearly visible and which position can not be recognized otherwise. Angle measurement fixings have been performed using fixing points on the bottom of the container or on structures outside the object to be measured and using an angle value obtained from the angle measurement device, whereby the coordinate systems could be mathematically combined. The permanent marks are attached to the bottom of the container or to the frame structures of a factory wall, for example, in vicinity to the converter. When angle measurements were used in the known methods, the angle measurement device informs the measuring device of the position of the object or container in relationship to the known surroundings.

In both direct and indirect angle measurement fixing methods, the permanent marks are, for example, small plates, cylinders, spheres or other regularly shaped objects made from a material which reflects laser radiation, and to which the laser beam emitted from the measuring device is manually directed, for instance by means of binoculars or some other targeting aids. In these known methods, the object is to direct the laser beam manually towards the center of the permanent marks in order to obtain a fixing point. The operators of the measuring device are thus required to perform several operations before all fixing points have been measured. The drawback of these known methods is seen in the fact that it is difficult to automate the fixing operation. When fixing is carried out by a person, there is a risk of errors in both the estimate of the center of the fixing points or permanent marks as well as in the actual aligning step.

EP 1 234 193 B1, which has a counterpart U.S. Pat. No. 6,922,251 to Kirchhoff et al. the disclosure of which is incorporated herein by reference, discloses a method for measuring the refractory lining of a metallurgical container by means of a laser scanner wherein the laser scanner is positioned centrally in front of the melting container in preparation of the measuring step to establish a precise definition of the position of the laser scanner relative to the melting container with the aid of permanent marks attached to the said melt container. After interrupting the production process and once the melting container has been emptied, measuring of the interior of the container can be performed in that a laser beam which can be deflected horizontally and vertically scans the inner surface of the container. The laser beams reflected from the refractory lining are received and are processed in accordance with their time of flight. Since also the position of the receiver is well known relative to the laser head and the respective angle position of the laser head has been determined for each individual laser beam, the shape of the surface of the refractory lining can be reconstructed from the data generated. Advantageously the melting container is not only scanned in its horizontally tilted position, but scanning is also done in two additional tilted positions, for example 20° upwards and approximately 20° downwards to possible scan the entire interior of the melting vessel.

After the central scan of the refractory lining, also a left and right scan is performed in the method known from EP 1 234 193 B1 to also scan the entire side wall near the opening of the melting vessel by moving the laser scanner into left or right positions with respect to the melting vessel. The laser scanner has to be moved because the melting vessel can be tilted about its horizontal axis only but not to the left or right. However, each time the laser scanner is moved, an additional position measurement of the laser scanner must be performed with the laser scanner when scanning from the left or right position prior to actual measuring scan. This requires additional time of several minutes and thus prolongs the interruption time of the production process.

U.S. Pat. No. 6,922,252 B2 discloses a method for measuring the refractory lining of a metallurgical melting vessel, wherein the surface of the refractory lining of the container is also scanned by means of a laser scanner, with a second laser head provided for determining the respective position of the laser scanner by means of measuring marks which are provided to the wall of the building opposite to the melting container such that the laser scanner is positioned between the measuring marks and the melting vessel. In this prior art method the position determining laser, also called laser tracker, rotates in a distance above the laser scanner to find the measuring marks mounted to the building behind the laser scanner and thus to determine the respective location of the laser scanner. Since the position of the laser tracker relative to the laser scanner is known, the respective location of the laser scanner can be derived therefrom. A drawback of this prior art method is seen in the fact that the laser tracker is arranged at the tip of a rod or shaft so that the precise location of the laser tracker does not remain unchanged relative to the laser scanner since impacts, building vibrations or unavoidable deformations of the rod-like holder for the laser tracker lead to measuring errors which can influence the preciseness of the measurement in a significant way. Further, the measuring angles of the two laser systems must be aligned to each other which also leads to significant measuring errors.

It is therefore the object of the invention, to improve the method known from EP 1 234 193 B1 in such a way that measuring of the refractory lining of a metallurgical melting vessel can be carried out faster as with this prior art method.

As a solution for this object, a method is provided as referred to at the introductory part, i.e. for measuring the refractory lining of a metallurgical melting vessel, e.g. a steel converter, by means of a laser scanner which comprises a laser head for emitting laser beams which can be deflected in vertical and horizontal directions and a receiving means in the vicinity of the laser head for receiving the laser beams reflected from the refractory lining to determine their directions and their time of flight. In the measurement method of EP 1 234 193 B1, prior to the actual measuring of the refractory lining, the precise position and heading of the laser scanner in relation to the coordinate system of the converter tilt axis is established by measuring the distance of the laser scanner with respect to the positions of previously installed and defined permanent marks. This initially mapped precise position of the laser scanner will be referred to herein as the initial reference position and heading of the laser scanner.

Next, the steel production process within the converter is terminated and the converter is tilted into a position for measuring whereby the opening of the converter is facing the laser scanner. Then, a first scanning of the refractory lining is carried out with the laser scanner positioned in front of the opening of the converter, while simultaneously scanning two or more temporary marks.

The temporary marks can be fixed marks positioned in front of the converter prior to terminating the steel production process or alternatively, certain incidental structures on or within the container such as slag or funnels or craters formed by nozzles within the refractory lining. From the scanning data, the position of the temporary marks in relationship to the coordinate system of the laser scanner is determined so that the position of the temporary marks can be calculated in the coordinate system of the converter tilt axis.

Thereafter, if the laser scanner is moved to one or more new positions in front of the converter which are not defined or fixed at that moment and additional scan of the refractory lining is performed from those new positions, by also simultaneously scanning the temporary marks from the new laser scanner positions the new position and heading of the laser scanner relative to the coordinate system of the converter tilt axis can be calculated. From scanning of the temporary marks from the new laser scanner positions, the position of the temporary marks within the coordinate system of the laser scanner is simultaneously calculated and from the previously calculated position of the temporary marks in relation to the coordinate system of the converter tilt axis, the new position and heading of the laser scanner relative to the coordinate system of the converter tilt axis can be calculated. From the point data generated by the laser beam scans, the converter tilt angles and the laser scanner positions, the internal contour of the refractory lining of the steel converter can be derived.

Optionally, the converter can be tilted into one or more additional positions and additional scans of the refractory lining are made at each of the additional positions by repeating the steps described above.

In its broadest form the invention relates therefore to a method wherein based on previously made position measurings via permanent marks during a measuring scan of the container from the first scanner position, the position of two or more temporary marks are measured at the same time, which are recognized from different scanner positions during additional measurements so that the location and heading of the laser scanner can be calculated in relation to the tilt axis of the container. The permanent marks used for position determination of the laser scanner can be part of the building or part of the melting vessel. As part of the building, the permanent marks can be cylinders, spheres or other unmovable marks which are secured to the building or to the floor of the building. The permanent marks need not be separately positioned or attached bodies as it suffices that they are part of the building which does not change its position and that they can be scanned by the laser beam so that they allow a precise position determination of the laser scanner.

In another embodiment, the permanent marks are not part of the building but are attached to the melting container or form part of the melting vessel, since it can suffice to determine the position of the laser scanner relative to the melting vessel from scanning the opening of the container or other parts thereof which are provided with or without permanent marks. According to the invention, after a first positioning scan by which the precise position of the laser scanner relative to the melting vessel was determined, either temporary marks in the vicinity of the opening of the melting vessel are positioned and are scanned simultaneously during the measuring scan, with one mark provided right and left in front of the opening, or the edges of the opening of the melting vessel or residual slag possibly adhering thereto or funnels or craters formed by nozzles, or other recognizable structures in the refractory material can be used as temporary marks and can be scanned during measuring. During the first central measuring scan not only the refractory lining of the melting vessel is scanned by the laser beam but also the temporary marks which positions can also be determined by the laser scanner as precisely as the reflecting points on the refractory lining.

In a second step the laser scanner is now positioned left or right to the opening of the melting vessel to scan one side of the refractory lining and to thereby possibly scan the entire interior of the container. At the same time as performing the measuring scan, the laser beam also scans the temporary marks which locations had been determined previously during the central measuring scan so that the precise positioning of the laser scanner can be calculated without requiring a further positioning scan for the laser scanner as was required prior to the first central measuring scan.

Thereafter the laser scanner is moved to another position, for example to the right of the central position and the interior of the melting vessel is scanned again with the temporary marks being scanned at the same time as well, so that from its previously determined positioning the respective new (right) scanning position of the laser scanner can be calculated. This leads to time saving of more than 50%, as for each position scan two minutes are required presently, since the total measuring procedure in the prior art methods which do not use temporary marks, takes 11 to 12 minutes while the method according to the invention needs only 5 minutes interruption of the production process.

The invention will now be described in connection with the drawing; wherein:

FIG. 1 is a schematic plan view of a converter with several positions of a laser scanner;

FIG. 2 is a schematic side view of FIG. 1.

It is to be noted that in all figures same parts are provided with the same reference numerals. In particular, FIG. 1 shows a converter 1 as metallurgical melting vessel having a horizontal axis H and a tilt axis 8 with the converter 1 being tilted outwardly a slight amount (about 20°) so that one can see its opening 7. Approximately in the middle or center of the opening 7, a laser scanner 2 is positioned which can emit a laser beam 4 to the converter 1 for scanning of its refractory lining 6. The positioning of the laser scanner 2 in front of the opening 7 of the converter 1 needs not be precisely central; it is sufficient if it is approximately in the middle of the opening 7 so that the interior of the converter 1 can be scanned as uniformly as possible.

With reference to the converter 1, three permanent marks $PM_1$ $PM_2$ $PM_3$ are provided behind the laser scanner 2 and which are used for determining the positioning of the laser scanner 2 in the central positioning according to FIG. 1. It is to be noted that two permanent marks can be sufficient for position determination. The permanent marks $PM_1$-$PM_3$ are cylinders in the present embodiment; they can also be spheres or other marks which are suitable for reflecting the laser beams 4 emitted from the laser head 3. It is necessary only that all permanent marks $PM_1$-$PM_3$ are stationary marks fixed in some manner, affixed to the building for example, so that they do not change their positions in relationship to the converter 1.

FIG. 1 shows further two temporary marks $TM_1$ and $TM_2$ which are positioned right and left of the opening 7 of the converter 1 prior to starting the measuring process. As was referred to in the introductory part of the description, the temporary marks $TM_1$, $TM_2$ are cylinders as well, but can also be spheres or other reflecting bodies, and it is important only that the temporary marks remain at the same location during all three set-up positions of the laser scanner 2, 2', 2". After measuring they can be removed and must be positioned in front of the converter only for a new measurement. They then can be repositioned at new locations. It is only necessary that they are within the scanned area of the laser scanner 2. In other embodiments, two or more temporary marks may be used.

The laser head 3 and the receiving means 5 which are in defined spaced relationship to each other and which are used with the method according to the invention, are known per se. The laser head 3 operates such that it directs a laser radiation from a laser source towards a deflecting mirror, for example a polygon mirror, which deflects the laser beams 4 by its rotation. As wave length for the laser beams the visible light or the near infrared is suitable. The deflection of the laser beams 4 is effected in vertical direction if the rotating mirror is rotated about a horizontal axis. If the laser head 3 is also rotated by a stepper motor about a vertical axis, the laser beams 4 scan the surface of the refractory lining 6 in a disk like manner.

FIG. 2 shows the measuring process for determining the surface of the refractory lining 6, whereas in FIG. 1 the initial positioning scan is shown by fully drawn lines and the actual measuring scans are indicated by broken line laser beams 4', 4".

In particular, the following steps are carried out with the method according to the invention:

The temporary marks $TM_1$, $TM_2$ are placed in front of the converter 1.

The laser scanner 2 is positioned approximately centrally in front of the converter 1.

The permanent marks $PM_1$-$PM_3$, which are affixed to the building, are scanned by the laser scanner 2 with the laser head 3 being directed to the rear, i.e. facing away from the opening 7 of the converter 1.

The permanent marks $PM_1$-$PM_3$ are identified and their positions are calculated relative to the coordinate system of the laser scanner 2.

Using previous information about the position of the permanent marks $PM_1$-$PM_3$ and the position of the converter tilt axis 8, the position of the laser scanner 2 is fixed relative to the converter 1. Said information was obtained during preliminary fixing measurements.

The production process within the converter 1 is interrupted.

The converter 1 is tilted into a first position, for example in direction of the horizontal axis H.

A first middle respectively central scan of the interior of the converter 1 is performed and at the same time the temporary marks $TM_1$, $TM_2$ are scanned as well.

The temporary marks $TM_1$, $TM_2$ are identified and their position relative to the laser scanner 2 is calculated. This allows to fix their positions relative to the converter 1.

The converter 1 is now tilted to a second position, for example 20° downwards.

A second central scan of the interior of the converter 1 is made.

The converter 1 is tilted to a third position, for example over 40° upwards based on the previous position (i.e. 20° upwardly based upon the horizontal axis H).

A third central scan is made.

The laser scanner 2 is moved from its central position to the left into position 2'.

A left scan of the refractory lining 6 is made while at the same time scanning the temporary marks $TM_1$, $TM_2$.

The temporary marks $TM_1$, $TM_2$ are identified and their position relative to the laser scanner 2' is calculated.

Since the position of the temporary marks $TM_1$, $TM_2$ relative to the converter 1 is known, the position of the laser scanner 2' in the left positioning can be determined relative to the converter 1.

Thereafter the laser scanner 2 is moved to the right into position 2" and the converter 1 is scanned from the right side with the temporary marks $TM_1$, $TM_2$ simultaneously being scanned from the right side.

The temporary marks $TM_1$, $TM_2$ and their positions relative to the coordinate system of the laser scanner 2' are calculated.

Since the position of the temporary marks $TM_1$, $TM_2$ relative to the converter 1 is known, the right position of the laser scanner 2" can be calculated and fixed relative to the converter 1.

From the data received from the receiving means 5 concerning the time of flight of the laser beams 4, 4' and 4" from the central scan, the left scan and the right scan and from the tilt angles of the laser scanner 2 the surface of the refractory lining 6 can be determined.

By comparing previously stored measuring results, changes in the thickness of the refractory lining 6 can be detected.

It is to be noted that the man skilled in the art knows how to modify the method according to the invention without departing from the scope of the patent claims.

The invention claimed is:

1. Method for measuring the refractory lining of a metallurgical melting vessel, by means of a laser scanner which comprises a laser head for emitting laser beams which is deflected in vertical and horizontal directions;
    and with a receiving means in the vicinity of the laser head for receiving the laser beams reflected from the refractory lining to determine their directions and time of flight;
    wherein in a step prior to the actual measuring of the refractory lining an initial reference position and heading of the laser scanner in relation to the coordinate system of a converter tilt axis has been established by previously installed and defined permanent marks;
    characterized in
    (a) that the steel production process within the converter is terminated;
    (b) that the converter is tilted for scanning into a position whereby the opening of the converter is facing the laser scanner;
    (c) that a first scanning of the refractory lining is carried out with the laser scanner in its initial reference position and heading in front of the opening of the converter, while simultaneously scanning two or more temporary marks, said temporary marks either being positioned in front of the converter prior to terminating the steel production process or they are represented by incidental structures on or within the converter;
    (d) that the position of the two or more temporary marks in relationship to the coordinate system of the laser scanner is determined so that the position of the temporary marks can be calculated in the coordinate system of the converter tilt axis;
    (e) that thereafter the laser scanner is moved to one or more new positions in front of the converter which are not defined at that moment;
    (f) thereafter a scan of the refractory lining is performed with the laser scanner positioned in front of the opening of the converter and simultaneously scanning the temporary marks and simultaneously determining the positions of the temporary marks within the coordinate system of the laser scanner so that from the previously calculated position of the temporary marks in relation to the coordinate system of the converter tilt axis the new position and heading of the laser scanner relative to the coordinate system of the converter tilt axis can be calculated; and
    (g) that thereafter, optionally, the converter can be tilted into one or more additional positions and steps are repeated; and finally
    (h) that from the point data generated by the laser beam scans, the converter tilt angles and the laser scanner positions, the internal contour of the refractory lining of the steel converter can be derived.

2. Method according to claim 1, characterized in that as permanent marks are used cylinders, spheres, plates or similar bodies, which are suitable for reflecting the laser beams.

3. Method according to claim 2, characterized in that at least two permanent marks are used.

4. Method according to claim 1, characterized in that as temporary marks are used cylinders, spheres, plates or similar bodies, or parts of the melting vessel, which are suitable for reflecting the laser beams and which do not change their position during measuring.

5. Method according to claim 4, characterized in that as temporary marks slag remainders are used which adhere to the opening.

6. Method according to claim 4, characterized in that as temporary marks are used significant structures which are formed in the refractory lining, like funnels or craters formed by nozzles.

7. Method according to claim 4, characterized in that at least two temporary marks are used.

8. Method according to claim 1, characterized in that the scanning of the refractory lining is made from at least two positions of the laser scanner through the opening of the converter.

9. Method according to claim 8, characterized in that the scanning of the refractory lining is made from three positions of the laser scanner through the opening of the converter, i.e. centrally in front of the opening, as well as left and right from the center.

10. Method according to one of claims 1, 3, 4, 8 or 9 characterized in that the refractory lining is scanned in more than one tilting position of the converter from at least one position of the laser scanner.

11. Method according to claim 10, characterized in that the converter is tilted into two positions for at least one position of the laser scanner.

12. Method according to claim 10, characterized in that for the two tilting positions of the converter are selected +20° and −20° based upon the horizontal axis.

13. Method according to claim 10, characterized in that the converter is tilted into three positions for at least one position of the laser scanner.

14. Method according to claim 13, characterized in that as the three tilting positions of the converter are selected as 0°, +20° and −20° based upon a horizontal axis.

15. Method according to claim 10, characterized in that the converter is scanned in more than one tilting position for more than one position of the laser scanner.

* * * * *